(12) United States Patent
Norton

(10) Patent No.: US 7,468,133 B1
(45) Date of Patent: Dec. 23, 2008

(54) HEATED BAFFLE ANAEROBIC LAGOON DIGESTER

(75) Inventor: Gary William Norton, P.O. Box 708, Livermore, CA (US) 94551

(73) Assignee: Gary William Norton, Livermore, CA (US)

(*) Notice: Subject to any disclaimer, the term of this patent is extended or adjusted under 35 U.S.C. 154(b) by 228 days.

(21) Appl. No.: 11/588,159

(22) Filed: Oct. 27, 2006

(51) Int. Cl.
C02F 3/28 (2006.01)

(52) U.S. Cl. .............. 210/603; 210/170.08; 210/175; 210/615

(58) Field of Classification Search ............. 210/150, 210/170.01, 170.08, 175, 603, 615; 435/174
See application file for complete search history.

(56) References Cited

U.S. PATENT DOCUMENTS

| | | | |
|---|---|---|---|
| 4,401,441 A * | 8/1983 | Chase | 48/111 |
| 5,091,315 A | 2/1992 | McCarty et al. | 435/290.1 |
| 5,256,281 A * | 10/1993 | Ngo et al. | 210/151 |
| 5,525,229 A * | 6/1996 | Shih | 210/603 |
| 5,593,575 A * | 1/1997 | Cretini | 210/170.06 |
| 5,630,942 A * | 5/1997 | Steiner | 210/603 |
| 5,792,355 A | 8/1998 | Desjardins | 210/605 |
| 6,136,194 A * | 10/2000 | Vogel et al. | 210/605 |
| 6,488,853 B1 | 12/2002 | Mullerheim | 210/615 |
| 6,540,920 B2 * | 4/2003 | Bounds et al. | 210/615 |
| 6,558,549 B2 * | 5/2003 | Cote et al. | 210/605 |
| 6,641,721 B2 | 11/2003 | Mullerheim | 210/173 |
| 6,773,595 B2 * | 8/2004 | Gantzer | 210/605 |
| 6,851,891 B2 * | 2/2005 | Baumgartner et al. | 405/129.9 |
| 6,875,350 B2 * | 4/2005 | Allard | 210/209 |

FOREIGN PATENT DOCUMENTS

| | | | |
|---|---|---|---|
| JP | 4-7092 | * | 1/1992 |
| JP | 5-261382 | * | 10/1993 |
| JP | 04-104680 | * | 4/1999 |
| JP | 2000-254672 | * | 9/2000 |

* cited by examiner

Primary Examiner—Fred Prince

(57) ABSTRACT

A new process for the production of methane gas from flush dairy operations utilizing heated baffles in a lagoon is disclosed. The baffles are aligned in rows with the rows oriented perpendicular to the flow of nutrient-rich liquid through the lagoon. The baffles are indirectly heated by either hot water or steam and are suspended sheets of porous material upon which methane-producing bacteria are resident. The methane is contained beneath and removed from an enclosing cover over the lagoon.

20 Claims, 4 Drawing Sheets

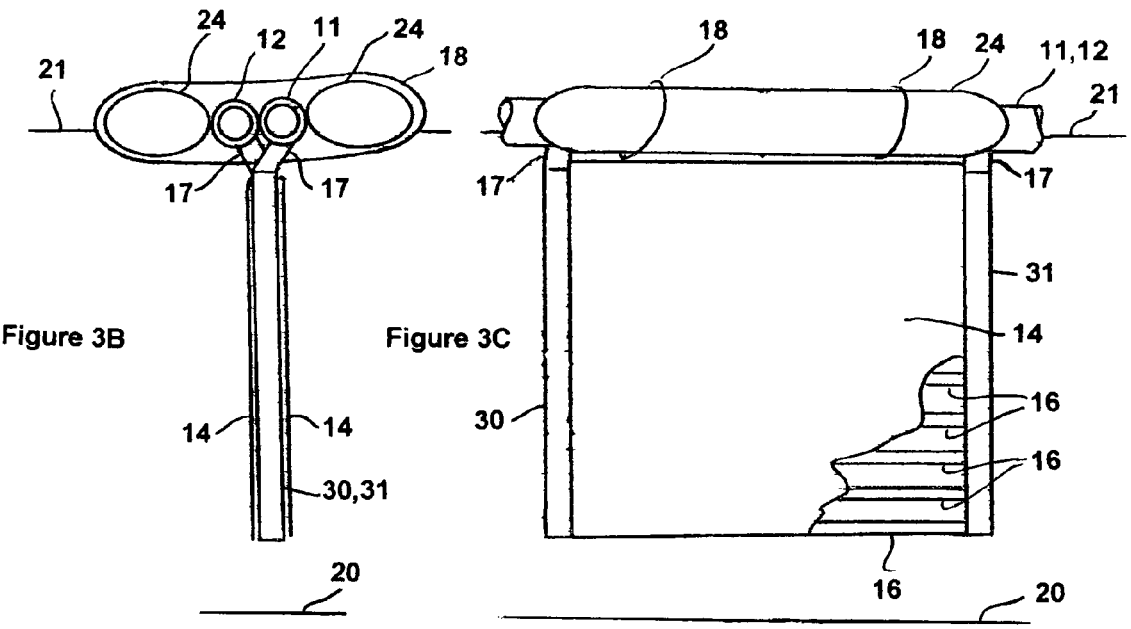
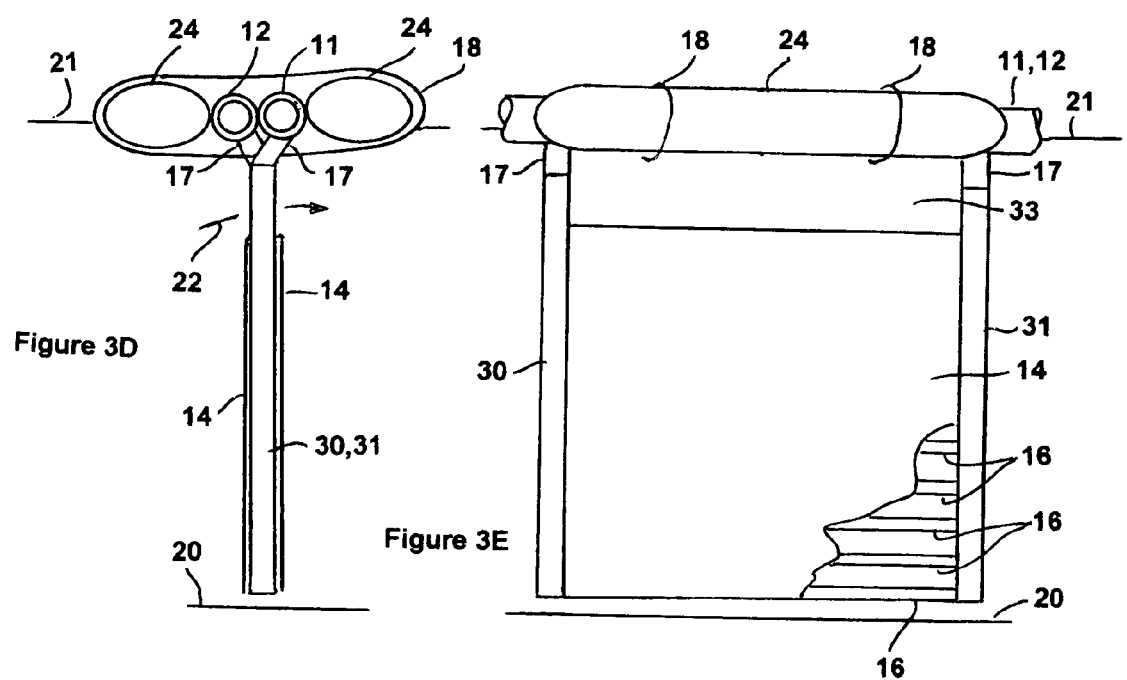

HEATED BAFFLE ANAEROBIC LAGOON DIGESTER

FIELD OF INVENTION

This invention relates generally to the field of anaerobic lagoon digesters. More particularly the invention relates to an improved means for structuring such a system through the user of baffles, which preferably can be heated to maintain optimum temperature conditions for the production of methane by bacteria on the surface of the baffles. The functions of the baffles is to provide a structure on which the bacteria can reside and to divert the incoming nutrient-rich liquid so as to contact the surfaces of the baffles in a systematic manner. The amount of methane gas produced by this type of anaerobic digester is largely dependent upon the surface area available for the residing gas-producing organisms. These specialized bacteria are most effective when resident upon a surface although some of the conversion to methane occurs in the liquid. The baffles are situated vertically in successive rows which are aligned perpendicular to the flow of the liquid through a lagoon. These lagoons vary in size and depth but typically are at least 30 feet wide, 10 feet deep and 50 feet long with an entry point at one end and a removal point at the other end. Some lagoons are substantially larger and deeper. The methane gas which is created is used for the production of electrical power.

CROSS-REFERENCE

None

STATEMENT REGARDING THE USE OF FEDERAL FUNDS

No federal funding, direct or indirect, has been utilized in conjunction with the development of the present invention.

STATEMENT REGARDING MICROFICHE RECORDS

No microfiche records are used in the application submitted for the present invention.

PUBLICATION

The invention disclosed in this application has not and will not be the subject of an application filed in another country or under a multilateral agreement that requires publication at eighteen months after filing. Pursuant to 35 U.S.C. 122(b), this application is not to be published other than in the United States.

PRIOR ART

No prior art can be found which discloses the present invention. Comment is required to understand why this seemingly obvious technology has not been utilized in the past in spite of a long standing need. First, most anaerobic digesters have not relied upon the processing of a liquid which has a low concentration of solids, commonly animal wastes, principally from cows or hogs for methane production. The reason for this is that digesters which are utilized in regions other than in central and southern California do not treat nutrient-rich liquid but instead process a sludge-like mass in a slow controlled manner. The collection of animal wastes in such operations is by scraping the wastes into a pit and then pushing the mass along in a digester over a period of about 17 days. The present invention is a process, largely unique to central and southern California, which processes a nutrient-rich liquid in less than 48 hours. This nutrient-rich liquid is produced by dairy operations which flush animal wastes from stalls and passageways three or four times a day using copious amounts of water. These dairies are termed "flush dairies."

The following patents are presented and distinguished from the present invention.

U.S. Pat. Nos. 6,641,721 and 6,488,853 by Steven B. Mullerheim, disclose a process and apparatus for treating waste water using a combination of a solids separator, such as a vortex separator, a gas floatation separation system. The present invention is not a gas floatation system and does not use a physical separator.

U.S. Pat. No. 5,091,315 by Perry L. McCarty, et al, discloses a bioreactor utilizing a shell with baffles which does not provide a support means for the growth medium as do the baffles in the present invention.

U.S. Pat. No. 5,792,355 by Gaetan Desjardins discloses a very complex system which does not utilize a lagoon.

SUMMARY OF THE INVENTION

The present invention generally relates to an improved anaerobic lagoon digester for flush dairies.

It is an object of the present invention to provide an improved means for the production of methane gas.

It is another object of the present invention to provide an improved means for the regulation of the temperature range over which the biological reactions which create the methane gas occurs.

It is a further object of the present invention to provide flow around and through baffles to increase the reactive surface area available and to better utilize the nutrient-rich liquid media being processed.

These and other objects and advantages of the present invention will be come clear to those skilled in the art in view of the description of the best presently known modes of carrying out the invention and the applicability of the preferred embodiment as described herein and as illustrated in the several figures of the drawings.

BRIEF DESCRIPTION OF THE DRAWINGS

FIG. 3B is an end view of a baffle FIG. 3C is a side view of a baffle FIG. 3D is an end view of a baffle FIG. 3E is a side view of a baffle

SPECIFICATION

Figure 1:
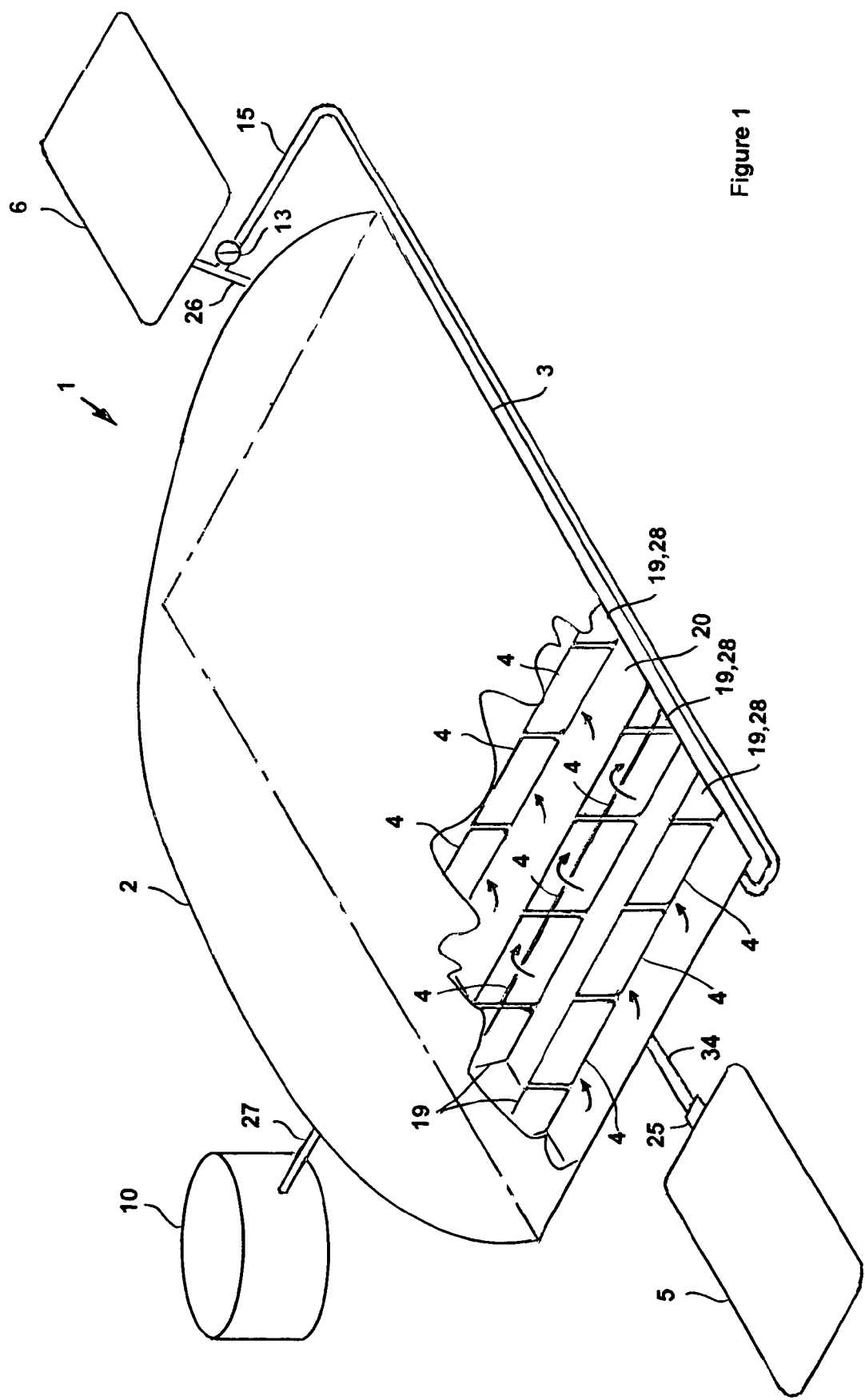
FIG. 1 is a perspective schematic view of the system according to the present invention

Best Method for Carrying Out the Invention

The best method for carrying out the present invention is as set out herein below. While variations to the basic system are possible, the description of the system as presented encompasses any baffle system for a lagoon which is used for anaerobic digestion. The use of heated baffles is an additional factor which makes the system more efficient.

Anaerobic digestion is the conversion of organic matter to methane and other gases in the absence of oxygen and is used for the treatment of contaminated wastewater that has high biological oxygen demand or BOD. The basic biological reaction converts animal wastes into methane which is then used to produce electrical power. The present invention involves what is termed "flush dairies" which are dairies and hog farms which flush stalls and passageways with copious amounts of water. These flushing operations are usually carried out three or four times a day and are utilized in large central California dairies and hog farms. This technique is effective due to the moderate temperatures and low rainfall found in these areas.

In other regions of the country, an alternative approach is the use of "plug digesters" in conjunction with what are termed "scrape dairies". For these operations, the manure is scraped into containment pits in a highly concentrated state. Plug digesters are to be found in common use in the northern and northeastern United States which have smaller dairies and which must deal with severe winter conditions. Plug digesters however have proven to be ineffective when used in conjunction with flush dairies as the source material to be utilized is substantially different. The source material for flush dairies is a comparatively dilute liquid. Scrape dairies utilize a sludge-like material which is a compact mass or a highly viscous liquid which is pushed through a containment pit with a transit time for the material of about 17 days. To be effective, the desired approach and the one employed by the present invention, the dilute liquid needs to be processed relatively quickly, in a day or two, with a maximum exposure to the biological agents during this period. The dilute liquid can be cycled through the lagoon several times depending upon the efficiency of a system.

For all digesters the biological agents are specialized bacteria which produce substantial amounts of methane and carbon dioxide. Before the gas can be used for the production of electrical power it needs to be scrubbed to reduce the amount of carbon dioxide and the excess moisture. The quality of the methane gas thus obtained has about one half the heating value of commercially supplied natural gas.

Flush dairies are relatively unique to the central valleys of California. Low rain fall, no snow or extended freezing, larger herds and ample water supplies are the key factors which dictate the use of this method. The present invention is unsuitable for mid-western and eastern states as well as Florida and the southern states due to their higher levels of rainfall. These factors also bar the use of flush dairies along California's north coast. Also, Florida and many of the southern states are too warm for extensive dairy cattle operations.

The baffles described by the present invention are used to provide a structure upon which the bacteria can grow and also to increase the transit time of the liquid while in contact with these surfaces by diverting the liquid around the baffles. A small amount of biological conversion occurs on the sides of a lagoon and a nominal amount occurs in the liquid. The biological reactions are temperature sensitive with optimum methane production occurring at about 95 degrees Fahrenheit. Also the pH of the liquid must be maintained within a suitable range.

The large volumes of solids in water from flush dairies and hog farms commonly results in a build-up of solids on the bottom of the lagoon. While periodic removal of solids from the lagoon will restore the lagoon to normal operation, the periodic expense and inability to use the lagoon during cleanup are serious drawbacks as these farms normally operate on a continuous basis. The present invention minimizes or eliminates the build-up of residual solids in a lagoon.

The present invention provides for increased biological activity with resulting higher rates of anaerobic conversion. The reduction of unwanted air emissions, particularly volatile organic compounds or VOCs and improved water quality are added benefits. Further, the present invention also increases the amount of methane produced.

Although many different materials are suitable, the preferred material to be used in the construction of the baffles is Mirafi 1120, a heavyweight nonwoven geotextile. This polypropylene mat-like structure is made by TC Mirafi and is ideal in that it is porous and supports a high density of bacterial growth. Of equal importance is the fact that substantial flow thorough the mat allows a flushing action to clean the mat which is preferrably about ¼ inch thick. In order to maintain the mats free of build-up, a slow but constant flow through the lagoon is needed. Normally the liquid level of a lagoon will vary about one foot over an eight hour period for 3 flushes a day. This surge is regulated through a surge pond however during quiet periods, a pump is needed to recirculate the liquid to maintain a minimum flow through the lagoon and the mats at all times.

The mats are preferrably arranged in a vertical orientation on either side of heating elements, commonly PVC piping. Thus the preferred baffle has closely proximate but indirect heating for the mats. One arrangement is to have the baffles divert the liquid over and under successive baffles with a small amount of liquid passing through the mats. Successive rows of baffles are placed in a lagoon perpendicular to the flow of the liquid.

To understand the range of applications and the details of implementing the present invention, reference is made to the drawings. Referring particularly to the figures wherein like-referenced numbers have been applied to like-parts throughout the description as illustrated in the several figures of the drawings.

The system according to the present invention is designated by the general reference number 1 and is shown in a perspective schematic view in FIG. 1. A liquid filled rectangular lagoon 3 having long parallel sides 7 and shorter parallel ends 8 and a bottom 20, said lagoon 3 having a waterproof liner 29 on said sides 7, ends 8 and bottom 20, an inflatable covering, a gas bag cover 2, envelopes the upper side of said lagoon 3, a source of nutrient rich liquid 5, a pool or pond, filling said lagoon 3 through an input weir 25 via an input pipe 34 and an out-fall pipe 26 having an out-fall pump 9 to a liquid storage pool or pond 6, at least one row of baffles 28 vertically aligned and parallel to said ends of said lagoon 8, said at least one row of baffles 28 comprised of at least one baffle 4, said at least one baffle 4 deflecting liquid flow when said liquid is in transit from said input weir 25 to said out-fall pipe 26, a gas storage container 10 connected by a gas line 27 from said gas bag cover 2, a return pump 13 and pipe 15 to maintain a minimum circulation in said lagoon 3.

Figure 2:
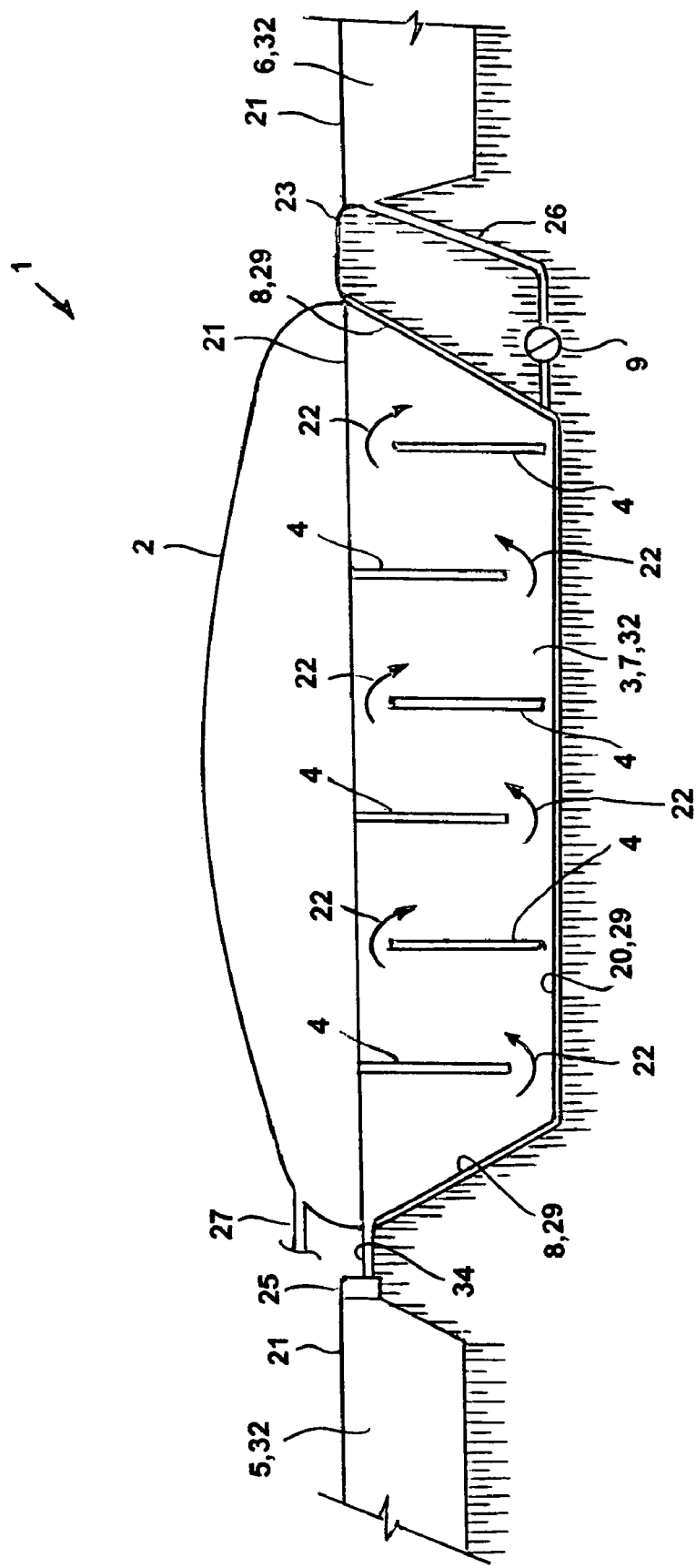
FIG. 2 is a side sectional schematic view of the lagoon

FIG. 2 shows a side sectional schematic view of the lagoon 3 and of said system 1, the liquid levels 21 shown in said input liquid source 5, said lagoon 3 and said liquid storage pond 6, said input weir 25 providing liquid to maintain said liquid level 21 in said lagoon 3, and said out-fall pump 9 maintaining said liquid level 21 in said lagoon 3, said liner 29 between the lagoon 3 and the ground 23 on the sides 7, ends 8 and bottom 20 of said lagoon 3, said at least one row 28 of baffles 4 shown in end view, six rows being shown, motion arrows 22 indicating alternate flow under and over said at least one row of baffles 28, said gas bag cover 2 shown over said lagoon 3 with said gas line 27 from said gas bag cover 2, said return pump 13 and return line 15 between said out-fail pipe 26 and the head of said lagoon 3.

Figure 3A:
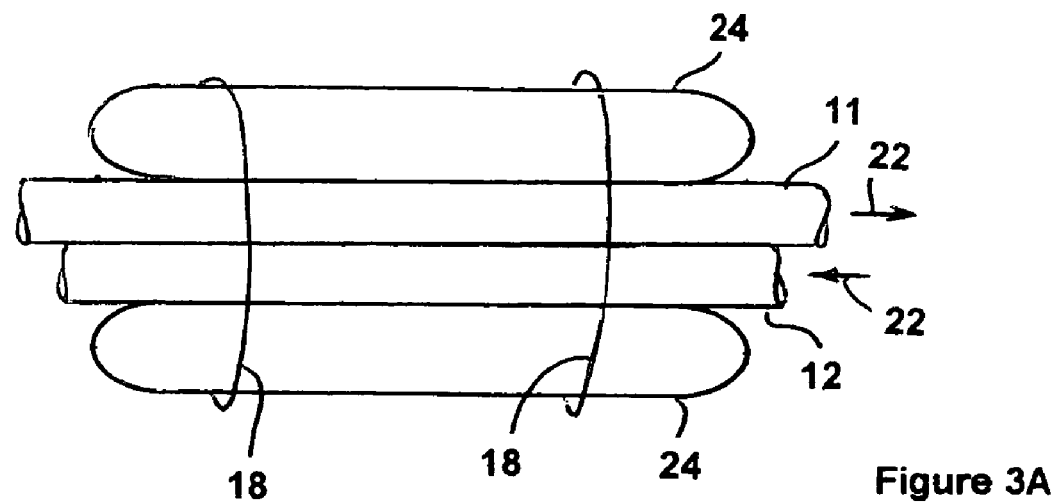
FIG. 3A is a top view of a baffle
Figure 3F:
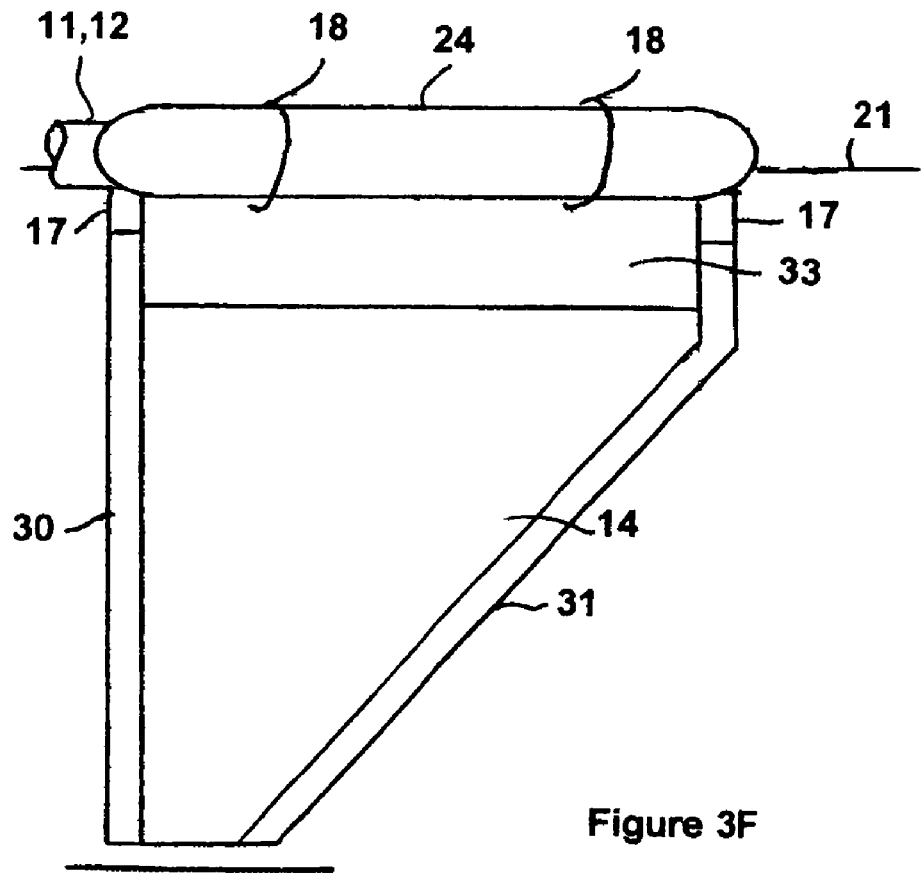
FIG. 3F is a side view of a triangular baffle

FIGS. 3A through 3F showing baffles 4 in detail. FIG. 3A showing a top view of a baffle 4 with floats 24 on either side of piping 11, 12, said piping supported by a pair of surrounding lines 18, one of said pipe 11 being a hot water and/or steam line and the other pipe 12 being the return line for hot water and/or steam. FIGS. 3B and 3C showing respectively end and side views of a high baffle 4 under which liquid flows, FIGS. 3D and 3E showing respectively end view of a low baffle 4 over which liquid flows, FIG. 3F showing a triangular baffle indicated by the general reference number 19, for FIGS. 3B through 3F, down pipes 30 and up pipes 31 direct hot water and/or steam respectively downward from said heat input line 11 and upward to said heat return line 12, said down pipe 30 and up pipes 31 connected by multiple horizontal pipes 16 arranged vertically, a sheet or mat 14 vertically aligned on either side of said multiple horizontal pipes 16, FIG. 3F being a truncated version of the baffles shown in FIGS. 3A through 3E.

The operation of the system 1 is as follows. Periodic flushing into said lagoon 3, commonly 3 or 4 times a day, raises the liquid level 21 of the lagoon a foot or so and flushes the bottom 20 of the lagoon 3 as the baffles 4 are elevated. Said baffles 4 are perpendicular to the flow of the liquid 32 impeding the flow from the input weir 25 which regulates the flow of the liquid 32 from the liquid input source 5 to the end of the lagoon 3 at which point the out-fall pipe 26 through the out-fall pump 9 propels the liquid 32 to an output storage pond 6. When the system 1 is not being flushed, the return pump 13 pumps a minimum amount through a return pipe 15 to maintain a minimum flow in the lagoon 3. The bottom 20, sides 7 and ends 8 of the lagoon are lined with a liner 29 to prevent seepage into the ground 23. A heat source, not shown, provides hot water and/or steam to each baffle by a pipe 11 with a return pipe 12, both supported on either side by floats 24 by two surrounding support lines 18. At each baffle 4 a connector 17 downward allows some of the hot water and/or steam to flow down a down pipe 30 horizontally through several transfer pipes 16 to an up pipe 31 and a connector 17 to the return pipe 12. Sheets, or mats, are vertically suspended from the top-most transfer pipe 16. The mats are permeable and support bacterial growth. Alternate rows of baffles are elevated and are close to the surface while intermediate baffles are constructed with a gap 33 above said mats 14 and said transfer pipes 16. The liquid 32 then flows alternately over and under the rows 28 of baffles 4 as well through the mats 14. Anaerobic bacteria resident on the mats convert the nutrients in the fluid to methane. A flexible cover 2 covers the lagoon 3 and a gas line 27 from the gas bag 2 to a storage container 10 as an energy source for creating electrical power.

Those skilled in the art will readily observe that numerous other modifications and alterations may be made without departing from the spirit and scope of the invention. For example, the baffles can be comprised of structures which are not flat and/or they can be made of different materials such as porous or have large effective surface areas to equal effect. Accordingly, the above disclosure is not intended as limiting and the appended claims are to be interpreted as encompassing the entire scope of the invention.

Reference Numbers

| Number | Description |
|---|---|
| 1. | General reference number for the anaerobic lagoon system according to the present invention |
| 2. | Gas bag cover |
| 3. | Lagoon |
| 4. | Baffle |
| 5. | Liquid source, input |
| 6. | Liquid storage, output |
| 7. | Side of lagoon |
| 8. | End of lagoon |
| 9. | Out-fall pump |
| 10. | Gas storage tank |
| 11. | Heat input line |
| 12. | Heat return line |
| 13. | Return pump |
| 14. | A mat; a reactive layer |
| 15. | Pipe, liquid return line |
| 16. | Transfer pipe |
| 17. | Connector |
| 18. | Support line |
| 19. | Triangular baffle |
| 20. | Bottom of lagoon |
| 21. | Liquid level |
| 22. | Flow arrow, liquid |
| 23. | Ground |
| 24. | Float |
| 25. | Input weir |
| 26. | Out-fall pipe |
| 27. | Gas line |
| 28. | Row of baffles |
| 29. | Liner |
| 30. | Down pipe, hot water |
| 31. | Up pipe, hot water |
| 32. | Liquid |
| 33. | Gap |
| 34. | Input flow |

What is claimed is:

1. An anaerobic lagoon digester comprised of:

a fluid filled anaerobic lagoon, a fluid inlet into and a fluid outlet from said lagoon, said fluid containing anaerobically digestible nutrients, a fluid source inputting said fluid into said lagoon through said fluid inlet, a fluid containment means receiving said fluid from said fluid outlet, at least one baffle located in said fluid in said lagoon and diverting the flow of said liquid, at least one float, said at least one baffle supported by said at least one float, a heat source, hot water and/or steam provided by said heat source, at least one heat pipe connected to said heat source, said hot water and/or steam conducted to and within said fluid in said lagoon to said at least one baffle by said at least one heat pipe, at least one return heat pipe connected to said heat source and to said at least one baffle, said hot water and/or steam conducted from said at least one baffle to said heat source by said at least one return heat pipe, said hot water and/or steam passing through said at least one baffle, said at least one heat pipe and said at least one return heat pipe supported within said lagoon by said at least one float, whereby said at least one baffle is heated by said hot water and/or steam, bacteria resident in said liquid and on said at least one baffle, said bacteria producing gas, whereby the transit time of said liquid through said lagoon is increased by said diversion and by the presence of said bacteria on said heated at least one baffle thereby increasing the rate of production of said gas.

2. A digester as in claim 1 wherein said at least one baffle is a set of at least two rows, each row comprised of at least one baffle.

3. A digester as in claim 2 wherein said at least two rows alternately divert said liquid over the top of one of said at least one row and under the bottom of an adjacent row of said at least two rows.

4. A digester as in claim 1 wherein said at least one baffle is comprised of at least one sheet of porous material.

5. A digester as in claim 4 wherein said porous material is mirafi.

6. A system for anaerobically generating gas from fluid suspended nutrients comprised of;
a fluid filled anaerobic lagoon, a fluid inlet into and a fluid outlet from said lagoon, said fluid containing anaerobically digestible nutrients,
a fluid source inputting said fluid into said lagoon through said fluid inlet,
a fluid containment means receiving said fluid from said fluid outlet,
at least one baffle located in said fluid in said lagoon and diverting the flow of said liquid,
at least one float, said at least one baffle supported by said at least one float,
a heat source, hot water and/or steam provided by said heat source,
at least one heat pipe connected to said heat source, said hot water and/or steam conducted to and within said fluid in said lagoon to said at least one baffle by said at least one heat pipe, at least one return heat pipe connected to said heat source and to said at least one baffle, said hot water and/or steam conducted from said at least one baffle to said heat source by said at least one return heat pipe, said hot water and/or steam passing through said at least one baffle, said at least one heat pipe and said at least one return heat pipe supported within said lagoon by said at least one float, whereby said at least one baffle is heated by said hot water and/or steam,
bacteria resident in said liquid and on said at least one baffle, said bacteria producing gas,
whereby the transit time of said liquid through said lagoon is increased by said diversion and by the presence of said bacteria on said heated at least one baffle thereby increasing the rate of production of said gas.

7. A system as in claim 6 wherein said at least one baffle is a set of at least two rows, each row comprised of at least one baffle.

8. A system as in claim 7 wherein said at least two rows alternately divert said liquid over the top of one row and under the bottom of an adjacent row of said at least two rows.

9. A system as in claim 6 wherein said at least one baffle is comprised of at least one sheet of porous material.

10. A system as in claim 9 wherein said porous material is mirafi.

11. A method for generating gas from fluid suspended nutrients comprised of the following steps;
the step of filling an anaerobic lagoon with a fluid containing anaerobically digestible nutrients, said lagoon having a fluid inlet into and a fluid outlet from said lagoon,
the step of supplying said fluid from a fluid source, said fluid source inputting said fluid into said lagoon through said fluid inlet, the step of receiving said fluid from said fluid outlet by a fluid containment means, the step of diverting the flow of said liquid around at least one baffle located in said fluid,
the step of supporting said at least one baffle by at least one float,
the step of providing hot water and/or steam provided from a heat source,
the step of connecting at least one heat pipe to said heat source, conducting said hot water and/or steam to and within said fluid in said lagoon to said at least one baffle by said at least one heat pipe,
connecting at least one return heat pipe to said heat source and to said at least one baffle, conducting said hot water and/or steam from said at least one baffle to said heat source by said at least one return heat pipe, passing said hot water and/or steam through said at least one baffle, supporting said at least one heat pipe and said at least one return heat pipe within said lagoon by said at least one float, whereby said at least one baffle is heated by said hot water and/or steam,
having bacteria resident in said liquid and on said at least one baffle, said bacteria producing gas,
whereby said diversion increases the transit time of said liquid through said lagoon and thereby the presence of said bacteria on said heated at least one baffle increases the rate of production of said gas.

12. A method as in claim 11 wherein the step of providing said at least one baffle is providing a set of at least two rows, each row being comprised of at least one baffle.

13. A method as in claim 12 wherein the step of providing said rows is by alternately diverting said liquid over the top of one of said at least one row and under the bottom of an adjacent row of said at least two rows.

14. A method as in claim 11 wherein the step of providing at least one baffle is providing at least one baffle comprised of at least one sheet of porous material.

15. A method as in claim 14 wherein the step of providing at least one baffle comprised of said porous material is providing material comprised of mirafi.

16. A means for enhancing the production of gas from an anaerobic lagoon comprised of;
a fluid filled anaerobic lagoon, a fluid inlet into and a fluid outlet from said lagoon, said fluid containing anaerobically digestible nutrients,
a fluid source inputting said fluid into said lagoon through said fluid inlet,
a fluid containment means receiving said fluid from said fluid outlet,
at least one baffle located in said fluid in said lagoon and diverting the flow of said liquid,
at least one float, said at least one baffle supported by said at least one float,
a heat source, hot water and/or steam provided by said heat source,
at least one heat pipe connected to said heat source, said hot water and/or steam conducted to and within said fluid in said lagoon to said at least one baffle by said at least one heat pipe, at least one return heat pipe connected to said heat source and to said at least one baffle, said hot water and/or steam conducted from said at least one baffle to said heat source by said at least one return heat pipe, said hot water and/or steam passing through said at least one baffle, said at least one heat pipe and said at least one return heat pipe supported within said lagoon by said at least one float, whereby said at least one baffle is heated by said hot water and/or steam,
bacteria resident in said liquid and on said at least one baffle, said bacteria producing gas,
whereby the transit time of said liquid through said lagoon is increased by said diversion and by the presence of said bacteria on said heated at least one baffle thereby increasing the rate of production of said gas.

17. A means for enhancing the production of gas from an anaerobic lagoon as in claim 16 wherein said at least one baffle is a set of at least two rows, each row comprised of at least one baffle.

18. A means for enhancing the production of gas from an anaerobic lagoon as in claim 17 wherein said at least two rows alternately divert said liquid over the top of one row and under the bottom of an adjacent row of said at least two rows.

19. A means for enhancing the production of gas from an anaerobic lagoon as in claim 16 wherein said at least one baffle is comprised of at least one sheet of porous material.

20. A means for enhancing the production of gas from an anaerobic lagoon as in claim 19 wherein said porous material is mirafi.

* * * * *